US010769070B2

(12) United States Patent
Pusdesris et al.

(10) Patent No.: US 10,769,070 B2
(45) Date of Patent: Sep. 8, 2020

(54) MULTIPLE STRIDE PREFETCHING

(71) Applicant: Arm Limited, Cambridge (GB)

(72) Inventors: Joseph Michael Pusdesris, Austin, TX (US); Miles Robert Dooley, Austin, TX (US); Alexander Cole Shulyak, Austin, TX (US); Krishnendra Nathella, Austin, TX (US); Dam Sunwoo, Austin, TX (US)

(73) Assignee: Arm Limited, Cambridge (GB)

( * ) Notice: Subject to any disclaimer, the term of this patent is extended or adjusted under 35 U.S.C. 154(b) by 60 days.

(21) Appl. No.: 16/140,625

(22) Filed: Sep. 25, 2018

(65) Prior Publication Data

US 2020/0097411 A1   Mar. 26, 2020

(51) Int. Cl.
*G06F 12/0862* (2016.01)
*G06F 9/30* (2018.01)
*G06F 5/06* (2006.01)

(52) U.S. Cl.
CPC ............ *G06F 12/0862* (2013.01); *G06F 5/06* (2013.01); *G06F 9/30043* (2013.01); *G06F 2212/6026* (2013.01)

(58) Field of Classification Search
CPC .... G06F 12/0862; G06F 9/3455; G06F 9/383; G06F 9/3832; G06F 9/30065; G06F 9/325; G06F 8/4442; G06F 9/345; G06F 9/3802; G06F 9/30043; G06F 5/06; G06F 2212/6026
See application file for complete search history.

(56) References Cited

U.S. PATENT DOCUMENTS

| 10,025,717 | B1 * | 7/2018  | Menezes ............ G06F 12/0862 |
| 2008/0229070 | A1 * | 9/2008  | Charra .................... G06F 9/383 712/207 |
| 2013/0185515 | A1 * | 7/2013  | Sassone ............. G06F 12/0862 711/137 |
| 2014/0359221 | A1 * | 12/2014 | Kalamatianos ..... G06F 12/0811 711/122 |
| 2017/0168946 | A1 * | 6/2017  | Wang .................. G06F 12/0862 |
| 2018/0018266 | A1 * | 1/2018  | Jones, III ............ G06F 12/0862 |
| 2018/0173631 | A1 * | 6/2018  | Sartorius ........... G06F 16/24558 |

* cited by examiner

*Primary Examiner* — Zhuo H Li

(74) *Attorney, Agent, or Firm* — Nixon & Vanderhye P.C.

(57) ABSTRACT

Apparatuses and methods for prefetch generation are disclosed. Prefetching circuitry receives addresses specified by load instructions and can cause retrieval of a data value from an address before that address is received. Stride determination circuitry determines stride values as a difference between a current address and a previously received address. Plural stride values corresponding to a sequence of received addresses are determined. Multiple stride storage circuitry stores the plurality of stride values determined by the stride determination circuitry. New address comparison circuitry determines whether a current address corresponds to a matching stride value based on the plurality of stride values stored in the multiple stride storage circuitry. Prefetch initiation circuitry can causes a data value to be retrieved from a further address, wherein the further address is the current address modified by the matching stride value of the plurality of stride values. By the use of multiple stride values, more complex load address patterns can be prefetched.

19 Claims, 6 Drawing Sheets

MULTIPLE STRIDE PREFETCHING

TECHNICAL FIELD

The present disclosure relates to data processing. In particular, the present disclosure relates to prefetching.

DESCRIPTION

A data processing apparatus which performs data processing operations on data values which are retrieved from specified addresses in memory may be provided with prefetching capability. The apparatus is arranged to retrieve data values from addresses specified by load instructions and the prefetching capability enables the apparatus to monitor the pattern of addresses being specified and to predict addresses which will be specified in the near future on the basis of that pattern. Data values can then be caused to be retrieved from those predicted addresses, before such addresses are actually specified by executed load instructions. This is a technique by which the latency associated with the retrieval of a data value from memory may be mitigated against. For example, if a sequence of addresses specified by load instructions is observed in which the addresses have a regular spacing (sometimes referred to as a "stride"), then further addresses may be generated for the purpose of prefetching by extending that "stride" sequence.

SUMMARY

In one example embodiment described herein there is an apparatus comprising: data loading circuitry to retrieve data values from addresses specified by load instructions for storage in a storage component; prefetching circuitry to receive the addresses specified by the load instructions and to cause the data loading circuitry to retrieve a further data value from a further address before the further address is received, wherein the prefetching circuitry comprises: stride determination circuitry to determine a stride value as a difference between a current address and a previously received address, the stride determination circuitry comprising stride sequence determination circuitry to determine a plurality of stride values corresponding to a sequence of received addresses; multiple stride storage circuitry to store the plurality of stride values determined by the stride determination circuitry; new address comparison circuitry to determine whether the current address corresponds to a matching stride value based on the plurality of stride values stored in the multiple stride storage circuitry; and prefetch initiation circuitry to cause the further data value to be retrieved from the further address, wherein the further address is the current address modified by the matching stride value of the plurality of stride values.

In one example embodiment described herein there is a method of prefetching data values comprising: retrieving data values from addresses specified by load instructions for storage in a storage component; receiving the addresses specified by the load instructions; causing retrieval of a further data value from a further address before the further address is received, wherein causing the retrieval comprises: determining a stride value as a difference between a current address and a previously received address; determining a stride sequence comprising a plurality of stride values corresponding to a sequence of received addresses; storing the plurality of stride values determined; performing a comparison to determine whether the current address corresponds to a matching stride value based on the plurality of stride values stored; and initiating a prefetch procedure to cause the further data value to be retrieved from the further address, wherein the further address is the current address modified by the matching stride value of the plurality of stride values.

In one example embodiment described herein there is an apparatus comprising: means for retrieving data values from addresses specified by load instructions for storage in a storage component; means for receiving the addresses specified by the load instructions; means for causing retrieval of a further data value from a further address before the further address is received, wherein the means for causing the retrieval comprises: means for determining a stride value as a difference between a current address and a previously received address; means for determining a stride sequence comprising a plurality of stride values corresponding to a sequence of received addresses; means for storing the plurality of stride values determined; means for performing a comparison to determine whether the current address corresponds to a matching stride value based on the plurality of stride values stored; and means for initiating a prefetch procedure to cause the further data value to be retrieved from the further address, wherein the further address is the current address modified by the matching stride value of the plurality of stride values.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
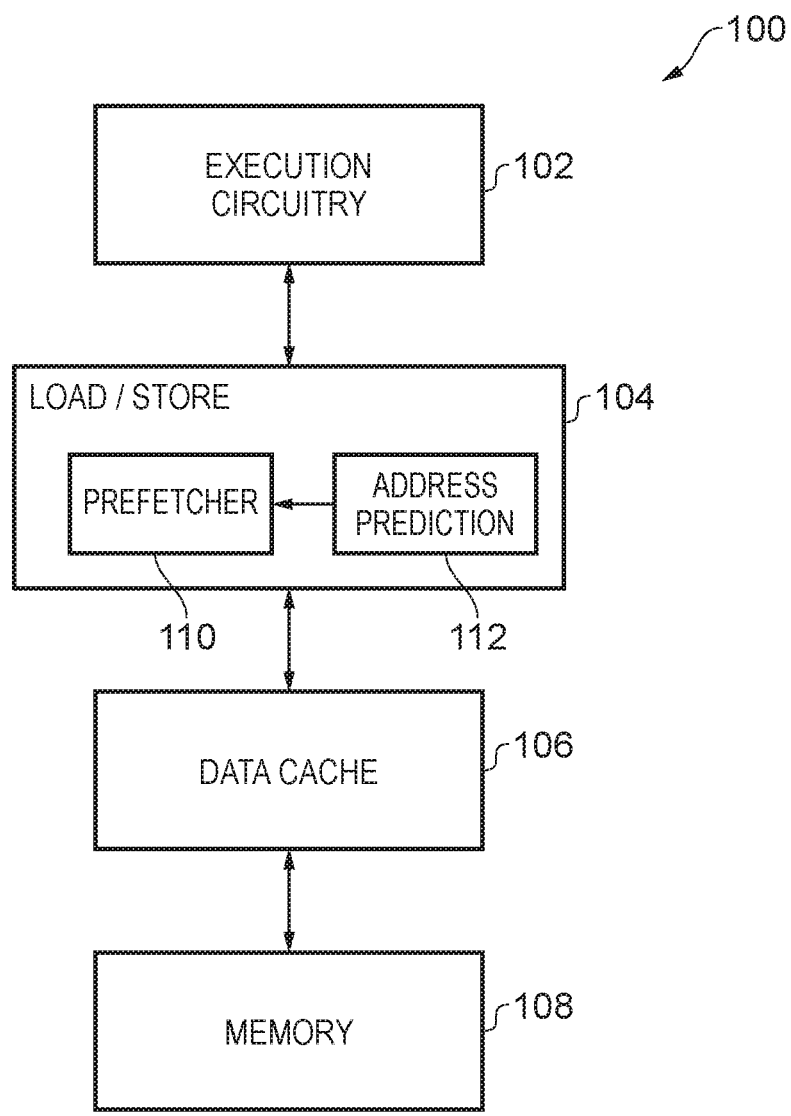
FIG. 1 schematically illustrates an apparatus in one example embodiment.

Before discussing the embodiments with reference to the accompanying figures, the following description of embodiments is provided.

In accordance with one example configuration there is provided an apparatus comprising: data loading circuitry to retrieve data values from addresses specified by load instructions for storage in a storage component; prefetching circuitry to receive the addresses specified by the load instructions and to cause the data loading circuitry to retrieve a further data value from a further address before the further address is received, wherein the prefetching circuitry comprises: stride determination circuitry to determine a stride value as a difference between a current address and a previously received address, the stride determination circuitry comprising stride sequence determination circuitry to determine a plurality of stride values corresponding to a sequence of received addresses; multiple stride storage circuitry to store the plurality of stride values determined by the stride determination circuitry; new address comparison circuitry to determine whether the current address corresponds to a matching stride value based on the plurality of stride values stored in the multiple stride storage circuitry; and prefetch initiation circuitry to cause the further data value to be retrieved from the further address, wherein the further address is the current address modified by the matching stride value of the plurality of stride values.

The present techniques recognise that there are circumstances under which an approach of merely determining a prefetch stride on the basis of the difference between subsequently specified addresses may not be capable of accurately predicting addresses from which data values will be retrieved and therefore for correspondingly successful prefetching to be carried out. For example where a program includes a loop which increments load addresses this can result in a regular pattern of load addresses from which a simple stride may be determined. However, when a program includes a nested loop the load addresses can exhibit a repeating stride pattern which incorporates more than one stride value. One stride value may be associated with an inner loop, whilst a possibly entirely different stride value may be associated with an outer loop. If the inner loop iteration count is sufficiently large then a simple single stride value may be appropriate and be able to support beneficial prefetching, yet if the inner loop iteration count is relatively small then the resulting pattern of load addresses can become more changeable and a single stride approach may not be able to support efficient prefetching. These problems of more complex stride patterns will also become more complex with further levels of loop nesting, or other types of iterative load address evolution.

In this context the present techniques propose that a sequence of received addresses is monitored and a plurality of stride values corresponding to that sequence is determined. The multiple stride values so determined are stored and can then be made use of to identify more complex patterns in the load instructions received. The plurality of stride values can be made use of in a variety of ways to identify such a multi-stride pattern in the received load instructions.

In some embodiments the multiple stride storage circuitry is arranged to store a table data structure, wherein entries of the table data structure comprise each of the multiple stride values stored in association with respective predicted addresses, and wherein the multiple stride storage circuitry is arranged to determine a predicted address for storage in an entry of the table data structure as the current address plus the stride value. Accordingly, the multiple stride storage circuitry therefore stores multiple predicted addresses (each with an associated stride value), enabling the apparatus to cover a range of patterns which may result from the multiple stride values as extrapolations from a current address. Operation of the apparatus may for example include a populating phase in which the table data structure is populated by observation of the sequence of received addresses, in order to build up a set of predicted addresses in association with the multiple stride values.

The previously received address against which the stride determination circuitry compares the current address in order to determine the stride value may be variously defined. In some embodiments the prefetching circuitry comprises sample address storage to store the previously received address for reference by the stride determination circuitry when determining the plurality of stride values for the sequence of received addresses. Accordingly, this sample address can then be used as a base with respect to which the plurality of stride values are calculated, and hence with reference to which the predicted addresses are also generated. Thus populated, the table data structure can then be used for reference when a new address is received and in some embodiments the prefetching circuitry is responsive to receipt of the current address to cause the multiple stride storage circuitry to perform a lookup for the current address in the propagation table data structure, and the multiple stride storage circuitry is responsive to a match between the current address and a hit predicted address in a hit entry in the table data structure to send a correct prediction signal to the prefetch initiation circuitry, wherein the prefetch initiation circuitry is responsive to the correct prediction signal to cause the further data value to be retrieved from the further address, wherein the further address is the current address modified by the stride value in the hit entry. Thus a match between the current address and a predicted address stored in the table data structure indicates that the mechanism by which the predicted address was generated (i.e. its associated stride value with respect to the sample address) has been validated and on that basis a prefetch may be initiated making use of the associated stride value. This stride value can be applied to the current address in various ways.

For example in some embodiments the further address is the current address with addition of an address offset, wherein the address offset is the stride value in the hit entry multiplied by a prefetch distance factor. The prefetch distance factor can thus be used to "scale up" the stride value as appropriate, in particular in dependence on the memory latency, i.e. how long in advance of a data value being required it is necessary to initiate the prefetch, such that it is present when required. In some embodiments the multiple stride storage circuitry is further responsive to the match between the current address and the hit predicted address in the hit entry in the table data structure to modify the hit predicted address in the hit entry by addition of the stride value. Thus this updates the entry in the table data structure which has correctly predicted an address, such that at the next iteration of that stride it may (potentially) predict another address.

In some embodiments entries of the table data structure further comprise a counter value for each entry, wherein the multiple stride storage circuitry is responsive to a non-match between the current address and any of the predicted addresses in the entries of the table data structure to select a victim entry in the table data structure in dependence on the counter values of the entries of the table data structure and to allocate a new entry to replace the victim entry comprising the predicted address and the stride value. Accordingly, an associated counter value for each entry may be used to set relative priorities between the entries in the table data structure such that when an entry in the table data structure should be replaced, i.e. an existing entry is to be selected as a victim to allow allocation of a new entry, the victim selection may make use of these relative priorities. The counter values may be administered in a number of ways in order to set up such relative priorities, but in some embodiments the multiple stride storage circuitry is responsive to the match between the current address and the hit predicted address in the hit entry in the table data structure to set the counter value for the hit entry to a predetermined maximum value. Similarly in some embodiments the multiple stride storage circuitry is responsive to the non-match between the current address and any of the predicted addresses in the entries of the table data structure to select the victim entry in the table data structure as a victim entry for which the counter value has a predetermined minimum value.

The particular values employed for such counter values may be variously defined, but in some embodiments these can be relatively limited values, in order to limit the storage space that they require. For example a 2-bit counter may suffice.

In some embodiments the multiple stride storage circuitry is arranged to store an entry pointer, and is responsive to the non-match between the current address and any of the predicted addresses in the entries of the table data structure to increment the entry pointer to indicate a next entry in the table data structure and to select the victim entry in the table data structure in further dependence on the entry pointer. Accordingly, the victim entry (absence any other determining factor such as the above mentioned counter value) is selected on a round-robin basis.

Furthermore, in some embodiments the multiple stride storage circuitry is responsive to an increment of the entry pointer causing the entry pointer to reach a predetermined entry of the table data structure to decrease the counter values of the entries of the table data structure. The predetermined entry of the table data structure may be variously defined, but may for example be a first entry in the table, it therefore being understood that the entry pointer wraps around once it reaches the end of the table and this may be the point chosen at which to decrease the counter values of each entry in the table data structure. In other words this provides a mechanism by which over time the confidence associated with a given entry in the table decreases if it has not been maintained through hits in the lookup procedure.

In some embodiments the apparatus further comprises cumulative stride determination circuitry to determine at least one cumulative stride value as a sum of at least two of the plurality of stride values stored in the multiple stride storage circuitry, and wherein the new address comparison circuitry is responsive to reception of the current address to determine whether the at least one cumulative stride value is the matching stride value. Accordingly, not only are multiple stride values stored in the apparatus, but at least one combination of these multiple stride values is thus determined to generate a cumulative stride value. There may indeed be more than one cumulative stride value determined, and at least two of the multiple stride values may then be combined to generate this. In this manner a greater variety of potential load address patterns can be accommodated and predicted.

In order to support such cumulative stride determination, the apparatus may be variously configured, but in some embodiments the multiple stride storage circuitry further comprises an incoming stride buffer to store the plurality of stride values corresponding to a sequence of received addresses, wherein the incoming stride buffer has a FIFO structure. Thus a sequence of stride values is temporarily held in the FIFO buffer corresponding to the sequence of received addresses. This "snapshot" of the load addresses which are received can therefore be used as a sample from which the patterns of load addresses can be determined. It should be appreciated that the incoming stride buffer may have a range of difference sizes in difference implementations of the present techniques, depending on the size of pattern (or "depth") which should be covered.

In some embodiments the multiple stride storage circuitry comprises cumulative stride value storage to store the at least one cumulative stride value.

This at least one cumulative stride value thus stored may then be used in a variety of ways in order to identify load address patterns, but in some embodiments the cumulative stride value storage further comprises score value storage to store at least one score value in association with the at least one cumulative stride value, wherein the prefetch initiation circuitry is responsive to the at least one score value meeting at least a threshold value to cause the further data value to be retrieved from the further address, wherein the further address is the current address modified by the at least one cumulative stride value. Hence control over the triggering of the prefetch may be exerted by the setting of the threshold value, corresponding to a confidence in the at least one cumulative stride value.

The score values stored in this manner may be administered in a variety of ways, but in some embodiments the cumulative stride value storage is responsive to there being a match between a cumulative stride value stored in the cumulative stride value storage and at least one sum of at least two of the plurality of stride values stored in the multiple stride storage circuitry, to increase a score value stored in association with the cumulative stride value.

Similarly in some embodiments the cumulative stride value storage is responsive to there being no match between a cumulative stride value stored in the cumulative stride value storage and any sum of at least two of the plurality of stride values stored in the multiple stride storage circuitry, to decrease a score value stored in association with the cumulative stride value.

Moreover, this mechanism may be used to replace entries in the cumulative stride value storage once their associated "confidence" has sufficiently decreased. Thus in some embodiments the cumulative stride value storage is responsive to the score value stored in association with the cumulative stride value reaching a predetermined minimum value to cause the cumulative stride value to be replaced by a replacement cumulative stride value calculated as a sum of at least two of the plurality of stride values currently stored in the multiple stride storage circuitry.

In accordance with one example configuration there is provided a method of prefetching data values comprising: retrieving data values from addresses specified by load instructions for storage in a storage component; receiving the addresses specified by the load instructions; causing retrieval of a further data value from a further address before the further address is received, wherein causing the retrieval comprises: determining a stride value as a difference between a current address and a previously received address; determining a stride sequence comprising a plurality of stride values corresponding to a sequence of received addresses; storing the plurality of stride values determined; performing a comparison to determine whether the current address corresponds to a matching stride value based on the plurality of stride values stored; and initiating a prefetch procedure to cause the further data value to be retrieved from the further address, wherein the further address is the current address modified by the matching stride value of the plurality of stride values.

In accordance with one example configuration there is provided an apparatus comprising: means for retrieving data values from addresses specified by load instructions for storage in a storage component; means for receiving the addresses specified by the load instructions; means for causing retrieval of a further data value from a further address before the further address is received, wherein the means for causing the retrieval comprises: means for determining a stride value as a difference between a current address and a previously received address; means for determining a stride sequence comprising a plurality of stride values corresponding to a sequence of received addresses; means for storing the plurality of stride values determined; means for performing a comparison to determine whether the current address corresponds to a matching stride value based on the plurality of stride values stored; and means for initiating a prefetch procedure to cause the further data value to be retrieved from the further address, wherein the further address is the current address modified by the matching stride value of the plurality of stride values.

Particular embodiments will now be described with reference to the figures.

FIG. 1 illustrates a data processing apparatus 100 in accordance with one embodiment. The apparatus comprises execution circuitry 102, a load store unit 104, data cache 106, and a memory 108. The execution circuitry 102 is arranged to perform data processing operations making use of data values which are retrieved from storage at addresses in the memory 108. Retrieval of such data values is performed in response to load instructions which specify the address from which the data value should be retrieved, as well as the location into which that data value should be locally stored (e.g. in a storage component such as a register). The load/store unit 104 is provided to support the interaction of the execution circuitry 102 with the memory system such that these operations may effectively be delegated to it, leaving the execution circuitry 102 to continue with other operations whilst the interaction with the memory system continues. As part of the configuration of the load/store unit 104, it is provided with a prefetcher 110. This prefetcher 110 monitors the addresses specified by load instructions executed by the execution circuitry 102 and seeks to identify a pattern within them. For this purpose the load/store unit 104 also comprises address prediction circuitry 112 which forms part of this address prediction mechanism and provides the prefetcher with addresses from which it should retrieve data values from memory, even though these addresses have not yet been specified by a load instruction. The memory system is schematically illustrated in FIG. 1 by the data cache 106 and the memory 108, but it should be appreciated that the memory system could be considerably more complex than this, for example involving multiple levels of cache hierarchies. The prefetching actions of the prefetcher 110 causes the prefetched data values to be brought into the data cache 106 and it is this that enables the data processing apparatus to avoid the full latency associated with retrieving a data value from the memory 108, since when a data value required (in response to an address specified by a load instruction) is already present in the data cache 106 then it may be returned much more quickly to the execution circuitry 102 than if it needed to be retrieved from the memory 108. The address prediction circuitry 112 of the load/store unit shown in FIG. 1 has a configuration such that it determines multiple stride values corresponding to a sequence of received addresses, i.e. a sequence of addresses specified by load instructions executed by the execution circuitry 102 and these multiple stride values are stored in multiple stride storage circuitry of the address prediction circuitry 112. Further detail of this approach of the present techniques and various embodiments thereof are described in more detail with reference to the figures which follow.

Figure 2:
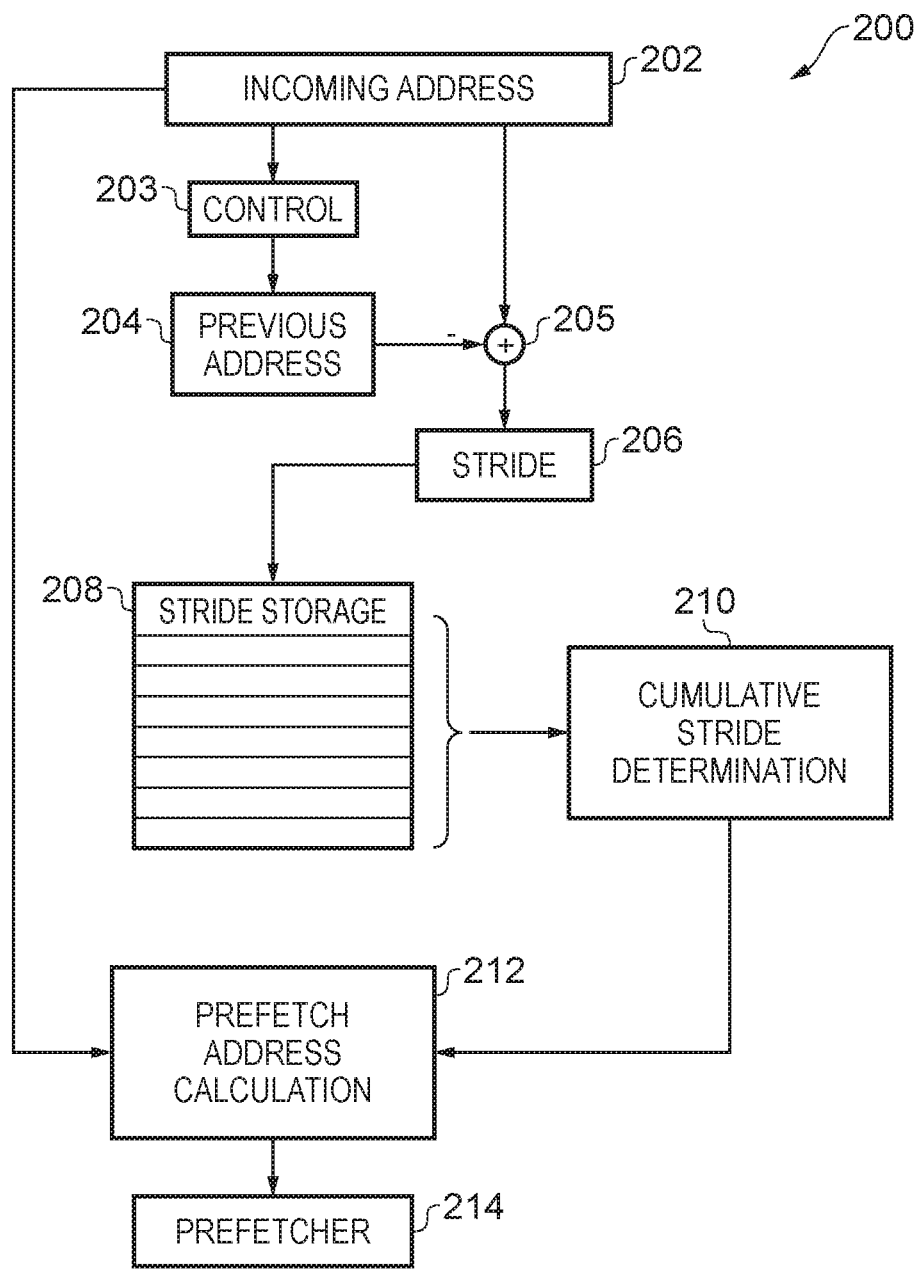
FIG. 2 schematically illustrates an apparatus in one example embodiment.

FIG. 2 schematically illustrates an apparatus 200 in one example embodiment. The illustrated components are provided to monitor a stream of incoming addresses specified by load instructions. Accordingly, the components shown in FIG. 2 may be considered to be an example of the address prediction circuitry 112 and the prefetcher 110 of FIG. 1. An incoming address 202, under the control of control gate 203 can be caused to be stored in the previous address storage 204. As will be discussed with reference to the figures that follow, depending on the particular embodiment this may take place as an ongoing process for each incoming address that is received, or only periodically in dependence on other factors. The incoming address 202 is also received by the addition circuitry 205. The addition circuitry 205 is in fact arranged to perform a subtraction and thus receives a negative input from the previous address storage 204 and thus subtracts the previous address from the incoming address 202. This generates a stride value 206. The apparatus 200 comprises multiple stride storage circuitry 208 which is arranged to hold multiple stride values simultaneously. There are a number of ways in which the multiple stride storage 208 may be populated with values, as will be described in more detail with reference to the example embodiments which follow. The apparatus 200 also comprises cumulative stride determination circuitry 210. On the basis of the multiple stride values stored in the multiple stride storage 208 the cumulative stride determination circuitry 210 can determine a number of different strides and/or stride combinations, and hence in general the apparatus is capable of detecting cumulative stride patterns in the load address stream. The output of the cumulative stride determination circuitry 210 is passed to the prefetch address calculation circuitry 212 which also receives the incoming address 202. On the basis of these inputs the prefetch address calculation circuitry 212 can then generate an address for prefetching which is passed to the prefetcher 214 to implement.

As an example of a context in which the present techniques may be used, when the load address stream relates to a section of program code which includes nested loops, and where more than one of the nested loops comprises a load address generation, a repeating stride pattern of load addresses may result which incorporates more than one stride. For example in the case of just two loops (an inner loop and an outer loop) the inner loop may exhibit one stride, whilst the outer loop may have its own quite different stride. In such examples, when the inner loop iteration count is large enough, memory latency can be hidden by simply detecting the stride of the inner loop and prefetching sufficiently far ahead. However, if the inner loop iteration count is relatively small, it is no longer possible to prefetch sufficiently far ahead without knowing the outer loop stride.

Figure 3:
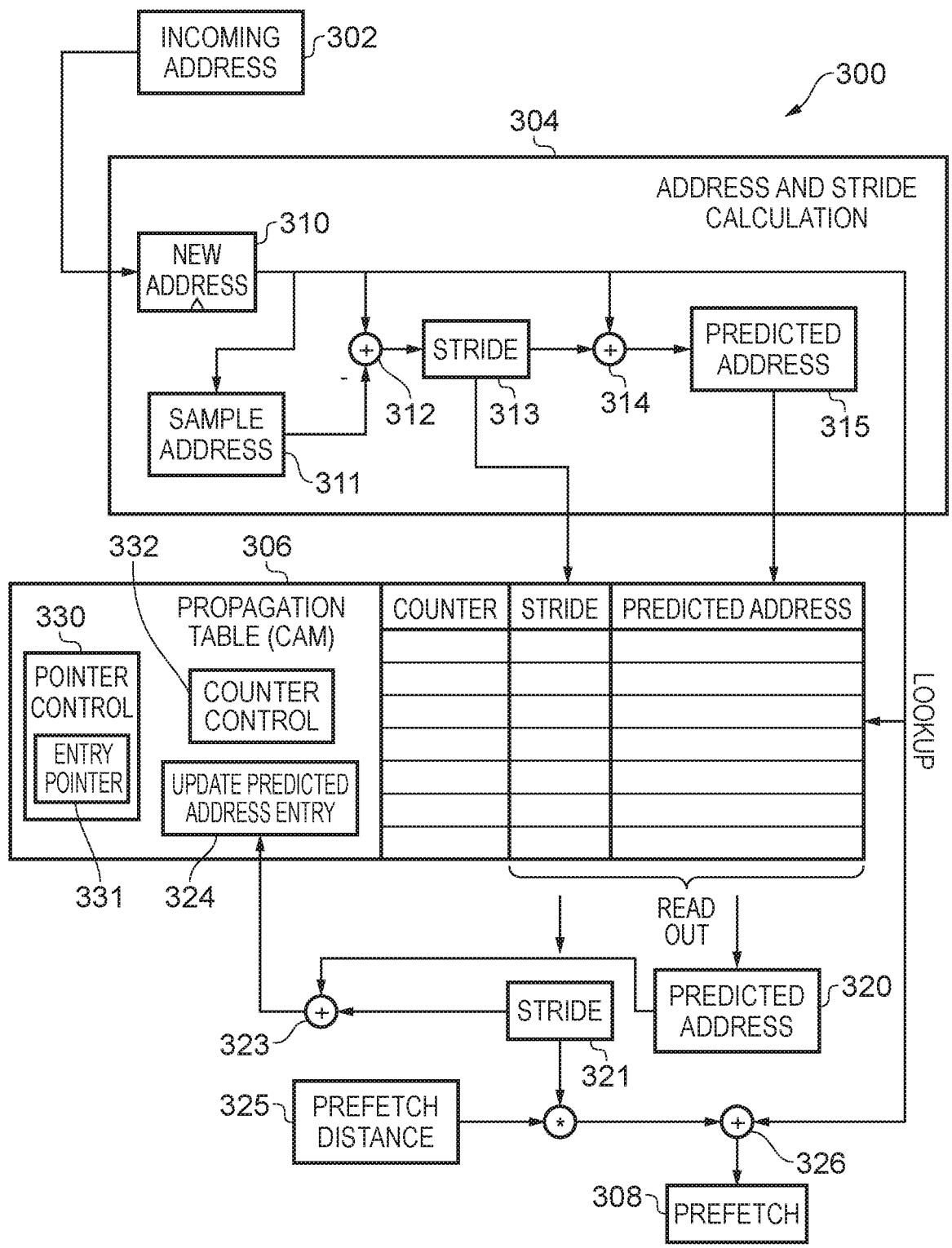
FIG. 3 schematically illustrates an apparatus in one example embodiments.

FIG. 3 schematically illustrates an apparatus in one example embodiment. Generally, the apparatus 300 comprises address and stride calculation circuitry 204, a propagation table 306, and a prefetcher 308. An incoming address 302 in the load address stream is received by the address and stride calculation circuitry 304 and held in new address storage 310. In an initial set up phase the new address 310 is stored as a sample address in the sample address storage 311. The sample address 311 can also later be updated, as will be described in more detail below. Once a sample address 311 has been stored then further incoming addresses 302 held by the new address storage 310 are compared, in that each is received by the addition circuity 312, which receives a negative input from the sample address storage 311, thus subtracting the sample address 311 from the new address 310. This generates a stride value 313. The stride value 313 is added to the new address 310 by the addition circuity 314 to form a predicted address 315. The stride value 313 and the predicted address 315 together form the content of an entry which is stored in the propagation table 306. The propagation table 306 is provided as a content-addressable-memory (CAM). In this manner, the propagation table 306 is populated with entries as an initial sequence of the load address stream is monitored.

As shown in the figure, the new address 310 is also used to perform a lookup in the propagation table 306. When the new address 310 matches a predicted address, this indicates that the propagation table entry has correctly identified a true cumulative stride in the load address stream. The corresponding predicted address 320 and its associated stride value 321 are read out. Addition circuitry 323 receives both of these values and adds them together, this forming an updated predicted address entry 324 which replaces the predicted address in the entry. Also the stride value 321 is multiplied by a predetermined fetch distance 325 and then added (by means of addition circuitry 326) to the new address 310 and the address thus generated is passed to the prefetch circuitry 308 to initiate a prefetch for the data value at this predicted address.

Accordingly, on an ongoing usage basis, new addresses are used to look up in the propagation table 306 and the hit entry is used to generate a prefetch and the stored predicted address in that entry is updated. However, when a miss occurs for the lookup in the propagation table 306, use is made (by means of pointer control 330) of an entry pointer 331. The entry pointer 331 is controlled by the pointer control 330 to point to an entry of the propagation table 306 and (under circumstances described below) to be incremented sequentially through entries of the propagation table, wrapping round from the last entry to the first entry, in a round-robin fashion. Further, when a miss occurs for the look up in the propagation table 306 reference may be made to a counter value which also forms part of each entry. In the example of FIG. 3, this is a 2-bit counter value. All counters are initialised to 0 (i.e. when a new entry is allocated into the propagation table) and only propagation table entries with a count of 0 can be evicted. When a miss occurs in the propagation table 306, if the entry pointer 331 is at the beginning of the table this causes a new sample address to be taken, i.e. the next new address 310 is then stored in the sample address storage 311. A new propagation table entry of this new address is not generated. Generally, when a miss occurs in the propagation table 306 and the pointer is not at the start of the table, then it is determined if the pointer currently indicates an entry for which the counter value is 0. If it is, then this entry can be replaced and a new stride 313 and predicted address 315 (with counter set to 0) form the new entry allocated in the propagation table 306. If however the pointer is not currently at an entry with a counter value of 0, then the pointer is incremented. If the pointer reaches the end of the table and wraps to the beginning then all counters are decremented. Conversely note that when a hit occurs in an entry of the propagation table 306 the counter value is set to its maximum, in this case this being a value of 3. Updating of the respective counter values of the entries of the propagation table 306 takes place under control of the counter control circuitry 302.

Figure 4:
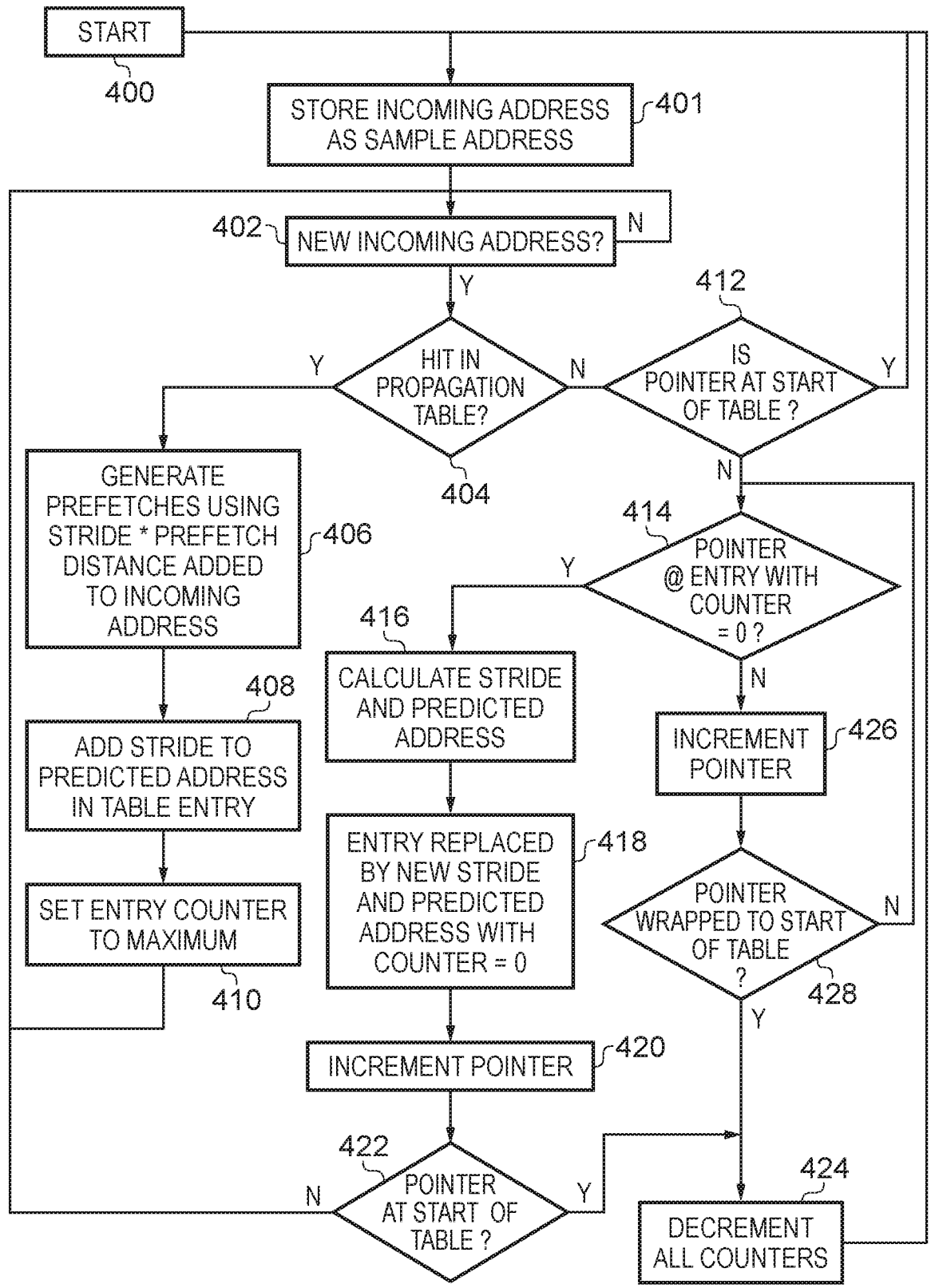
FIG. 4 is a flow diagram showing a sequence of steps which are taken in accordance with the method of one example embodiment.

FIG. 4 is a flow diagram showing a sequence of steps which are taken in the method of one example embodiment, according to which the apparatus 300 schematically illustrated in FIG. 3 may be operated. The flow begins at step 400. Then at step 401 the next incoming address is stored as the sample address. Then the flow proceeds to step 402 where it is determined if a new incoming address has been received, and the flow waits here until this happens. Then at step 404 the new incoming address is used to look up in the propagation table. If this hits on a predicted address of an entry in the propagation table the flow proceeds to step 406 where the predicted address and stride value in that entry are read out and prefetches are generated using the stride value (multiplied by a predetermined prefetch distance) added to the incoming address. The stride value is then used at step 408 to update (by addition) the predicted address in this propagation table entry. At step 410 the counter value for this table entry is set to its maximum value. The flow then returns to step 402.

If however at step 404 it is found that the incoming address has missed in the propagation table lookup then the flow proceeds to step 412, where it is determined if the propagation table pointer is currently at the start of the table. If it is then the flow returns to step 401 for a new incoming address to be stored as the sample address. If the pointer is not at the start of the table then at step 414 it is determined if the pointer is indicating an entry for which the counter value is 0. If this is the case then at step 416 a stride value and predicted address are calculated, and at step 418 these are used to replace the entry and the counter value of 0 is maintained. At step 420 the pointer is then incremented. Following this at step 422 it is determined if the pointer (through the increment of step 420) has now wrapped round to the beginning of the table. If it has not then the flow returns to step 402 and the next incoming address is received. If however the pointer has reached the beginning of the table then all counter values are decremented at step 424 and thereafter the flow returns to step 401 for a new incoming address to be stored as the sample address.

Returning to a consideration of step 414 if it is found (following the propagation table miss) that the pointer is not at the start of the table and is currently indicating an entry with a non-zero counter value then the flow proceeds to step 426 where the pointer is incremented. If this has not caused the pointer to wrap to the start of the table (step 428) then the flow returns to step 414 to determine if this is an entry which can be replaced (counter=0). Otherwise if the pointer is found to have wrapped to the start of the table at 428 then at step 424 all counters are decremented and the flow returns to step 401 for a new incoming address to be stored as the sample address.

Figure 5:
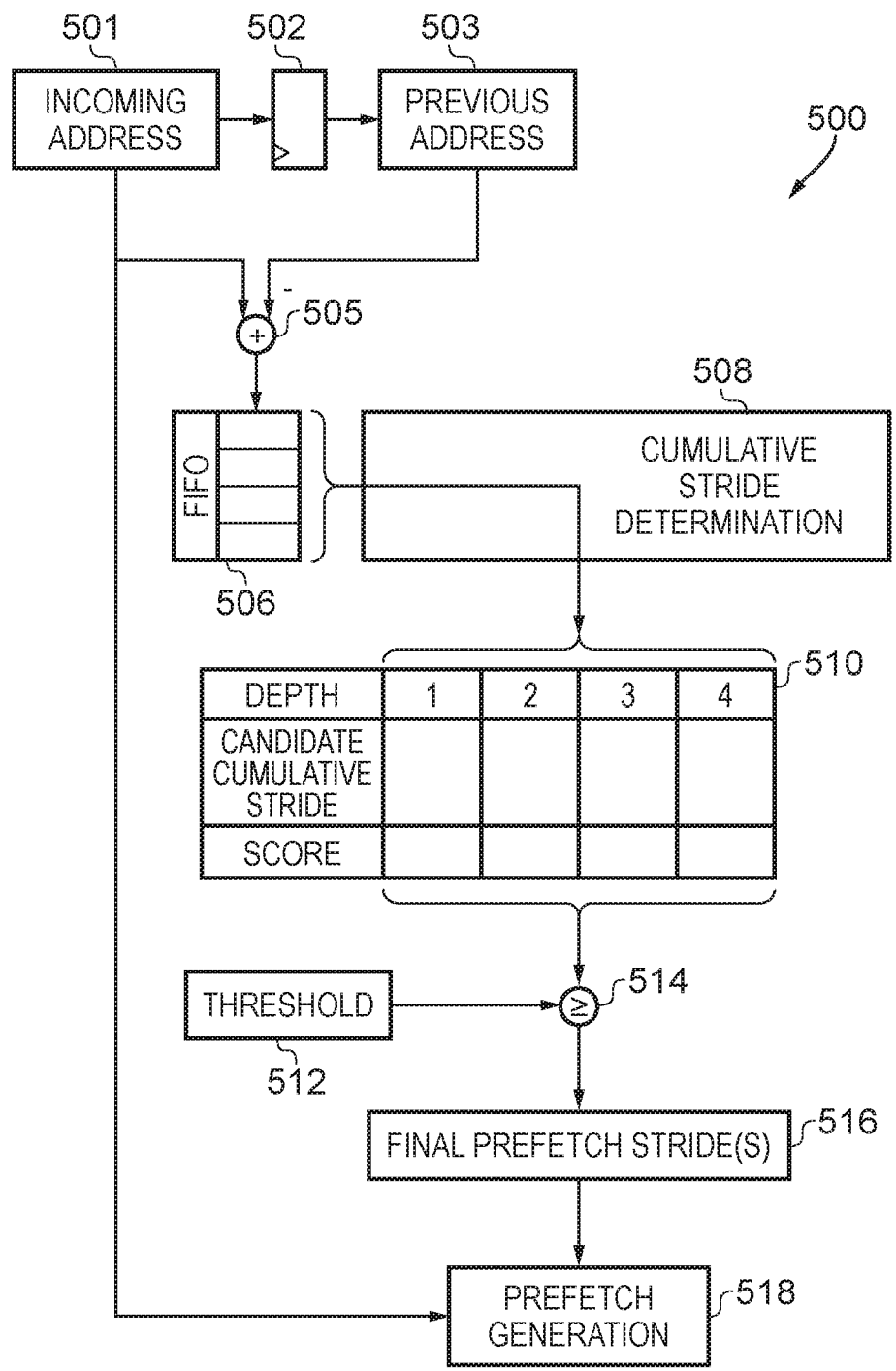
FIG. 5 schematically illustrates an apparatus in one example embodiment.

FIG. 5 schematically illustrates an apparatus 500 in one example embodiment. The apparatus 500 has both incoming address storage 501 and previous address storage 503, these being connected by the buffer 502, such that on an ongoing basis the latest address received in the load address stream is held by the incoming address storage 501 and the previous address received in the load address stream is held by the previous address storage 503. These are compared by means of the addition circuitry 505, which has a negative input from the previous address storage 503, such that the previous address 503 is subtracted from the new incoming address 501, giving a stride value between the two. Stride values determined in this manner are pushed into the FIFO buffer 506. In the example of FIG. 5 the FIFO buffer 506 is shown to comprise four entries, but this is an implementation choice depending on the system in which this apparatus is to be used. In particular, the number of entries in the shifting buffer 506 is based on the depth of the load address stream pattern which should be covered. On the basis of the content of the buffer 506, cumulative stride determination circuitry 508 calculates cumulative stride candidates at each depth. Each individual calculated stride held in the FIFO 506 can itself be a candidate cumulative stride, and this sum of sequential stride values held in the FIFO 506 can also be a candidate cumulative stride. Whenever a new stride value is inserted into the FIFO 506 a new cumulative stride can be calculated for each depth and compared against the candidate cumulative strides stored in the cumulative stride table 510. On a match with the existing content of the table 510 a corresponding score value is incremented. When any of the scores in the table reach a predetermined threshold value 512, compared by means of comparison of comparison circuitry 514, then this candidate cumulative stride can be chosen as a prefetch stride 516 which, by addition to the incoming address 501 (modified if necessary as described above by a prefetch distance) can be used in prefetch generation 518.

As a first illustrative example, the load address stream might generate a sequence of strides such as 2, 10, 2, 10, 2, 10, 2, 10, 2, 10, etc. In this example, allowing depths of 1 or 2 strides, candidate cumulative strides of 2, 10, and 12 will be generated. Table 1 below shows the load address stream in the left-hand column, the sequential address offsets (strides) in the next column, and the candidate cumulative strides (2, 10, 12) which populate the table at respective depths of 1 (single stride) and 2 (sum of two successive strides) respectively. The evolution of the table scores as the load address stream continues is shown.

TABLE 1

|           |                              | Depth | | |
|-----------|------------------------------|---|---|---|
|           |                              | 1 | 1 | 2 |
|           |                              | Cumulative stride | | |
| <Address> |                              | 2 | 10 | 12 |
| 0         | <Sequential address offset>  | Evolution of table scores | | |
| 2         | 2                            | 1 |   |   |
| 12        | 10                           | 0 | 1 | 1 |
| 14        | 2                            | 1 | 0 | 2 |
| 24        | 10                           | 0 | 1 | 3 |
| 26        | 2                            | 1 | 0 | 4 |
| 36        | 10                           | 0 | 1 | 5 |
| 38        | 2                            | 1 | 0 | 6 |
| 48        | 10                           | 0 | 1 | 7 |
| 50        | 2                            | 1 | 0 | 8 |
| 60        | 10                           | 0 | 1 | 9 |

First example load address stream and corresponding table content evolution

As a second illustrative example, the load address stream might generate a sequence of strides such as 2, 2, 10, 2, 2, 10, 2, 2, 10, etc. In this example candidate, allowing depths of 1, 2, or 3 strides, cumulative strides of 2, 10, 4, 12, and 14 will be generated. Table 2 below shows the load address stream in the left-hand column, the sequential address offsets (strides) in the next column, and the candidate cumulative strides (2, 10, 12) which populate the table at respective depths of 1 (single stride) and 2 (sum of two successive strides) respectively. The evolution of the table scores as the load address stream continues is shown.

|           |                              | Depth | | | | |
|-----------|------------------------------|---|---|---|---|---|
|           |                              | 1 | 1 | 2 | 2 | 3 |
|           |                              | Cumulative stride | | | | |
|           |                              | 2 | 10 | 4 | 12 | 14 |
| <Address> | <Sequential address offset>  | Evolution of table scores | | | | |
| 0         |                              | 1 |   |   |   |   |
| 2         | 2                            | 2 |   | 1 |   |   |
| 12        | 10                           | 0 | 1 | 0 | 1 | 1 |
| 14        | 2                            | 1 | 0 | 0 | 2 | 2 |
| 16        | 2                            | 2 | 0 | 1 | 0 | 3 |
| 26        | 10                           | 0 | 1 | 0 | 1 | 4 |
| 28        | 2                            | 1 | 0 | 0 | 2 | 5 |
| 30        | 2                            | 2 | 0 | 1 | 0 | 6 |
| 40        | 10                           | 0 | 1 | 0 | 1 | 7 |

|           |                              | Depth | | | | |
|-----------|------------------------------|---|---|---|---|---|
|           |                              | 1 | 1 | 2 | 2 | 3 |
|           |                              | Cumulative stride | | | | |
|           |                              | 2 | 10 | 4 | 12 | 14 |
| <Address> | <Sequential address offset>  | Evolution of table scores | | | | |
| 42        | 2                            | 1 | 0 | 0 | 2 | 8 |
| 44        | 2                            | 2 | 0 | 1 | 0 | 9 |

Figure 6:
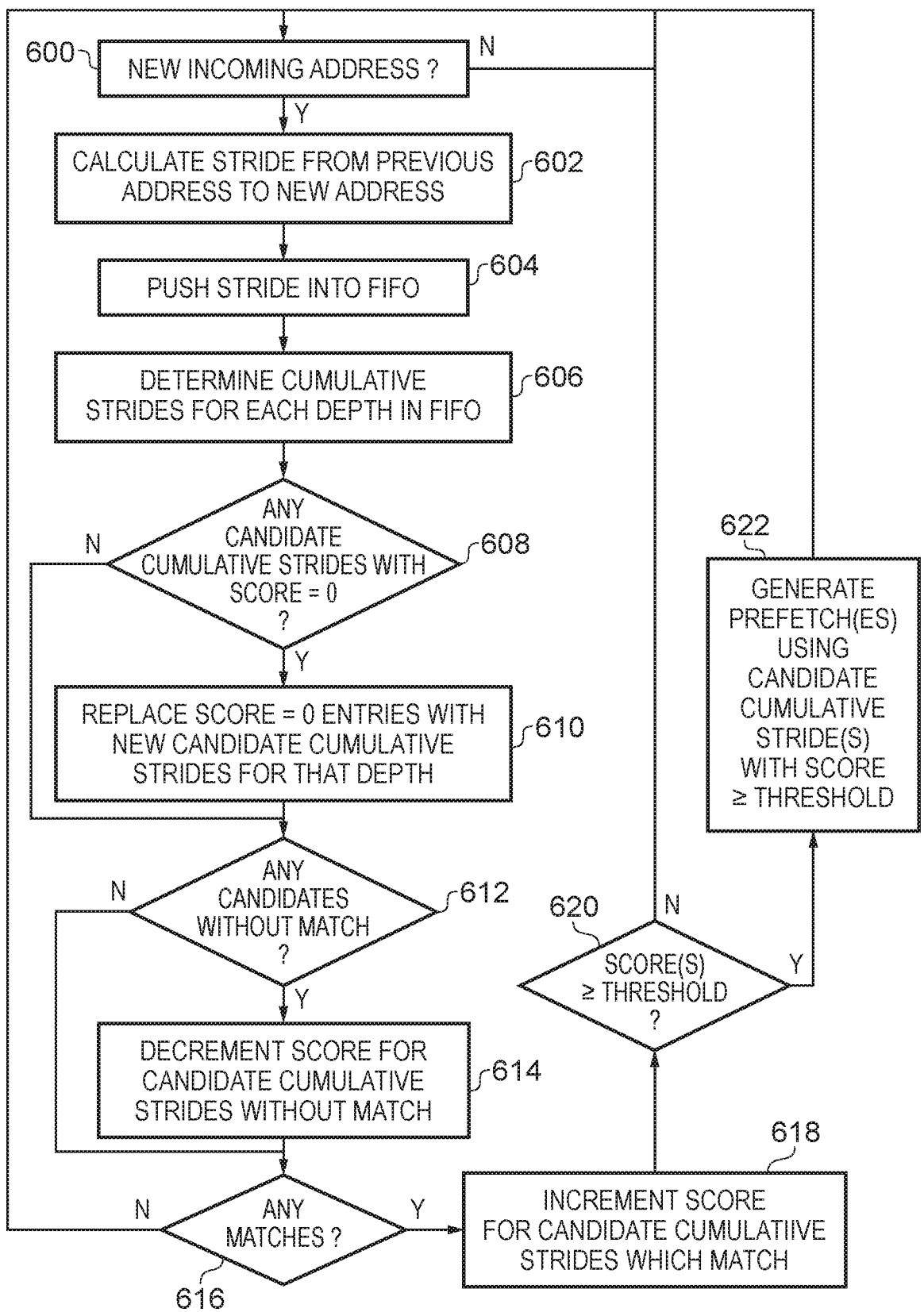
FIG. 6 is a flow diagram showing a sequence of steps which are taken according to the method of one example embodiment.

FIG. 6 is a flow diagram showing a sequence of steps which are taken in the method of one example embodiment, which may be used to operate the apparatus schematically illustrated in FIG. 5. The flow can be considered to begin at step 600 at which a new incoming address is waited for and then received. Thereafter at step 602 a stride value is calculated from the difference between this new address and the previously received address. This stride value is then pushed into the FIFO at step 604. Then, on the basis of the content of the FIFO, cumulative strides for each depth in the FIFO are calculated at step 606. At step 608 it is firstly determined if there are any candidate cumulative strides with a score of 0. If there are then any such entries may, at step 610, be replaced by new candidate cumulative strides for that depth. Then at step 612 it is determined if there are any candidate cumulative strides stored in the cumulative stride table which are not matched by the current content of the FIFO. This being the case then at step 614 the score for these entries is decremented. Conversely then at step 616 it is determined if there are any matches between the content of the FIFO and the cumulative stride table. If there are not, the flow simply returns to step 600 for the next new incoming address to be received and processed. However, if at least one match is found at step 616 then at step 618 the score for any candidate cumulative strides which match is incremented and at step 620 it is determined if any stores in the cumulative stride table now meet the predefined threshold for prefetch generation. If they do not the flow simply returns to step 600. However, if at least one score has met this threshold then at step 622 one or more prefetches is generated using the candidate cumulative strides for which the score met the threshold.

In brief overall summary apparatuses and methods for prefetch generation are disclosed. Prefetching circuitry receives addresses specified by load instructions and can cause retrieval of a data value from an address before that address is received. Stride determination circuitry determines stride values as a difference between a current address and a previously received address. Plural stride values corresponding to a sequence of received addresses are determined. Multiple stride storage circuitry stores the plurality of stride values determined by the stride determination circuitry. New address comparison circuitry determines whether a current address corresponds to a matching stride value based on the plurality of stride values stored in the multiple stride storage circuitry. Prefetch initiation circuitry can causes a data value to be retrieved from a further address, wherein the further address is the current address modified by the matching stride value of the plurality of stride values. By the use of multiple stride values, more complex load address patterns can be prefetched.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
    data loading circuitry to retrieve data values from addresses specified by load instructions for storage in a storage component;
    prefetching circuitry to receive the addresses specified by the load instructions and to cause the data loading circuitry to retrieve a further data value from a further address before the further address is received, wherein the prefetching circuitry comprises:
        stride determination circuitry to determine a stride value as a difference between a current address and a previously received address, the stride determination circuitry comprising stride sequence determination circuitry to determine a plurality of stride values corresponding to a sequence of received addresses;
        multiple stride storage circuitry to store the plurality of stride values determined by the stride determination circuitry;
        cumulative stride determination circuitry to determine at least one cumulative stride value as a sum of at least two of the plurality of stride values stored in the multiple stride storage circuitry;
        new address comparison circuitry to determine whether the current address corresponds to a matching stride value based on the plurality of stride values stored in the multiple stride storage circuitry, wherein the new address comparison circuitry is responsive to reception of the current address to determine whether the at least one cumulative stride value is the matching stride value; and
        prefetch initiation circuitry to cause the further data value to be retrieved from the further address, wherein the further address is the current address modified by the matching stride value of the plurality of stride values.

2. The apparatus as claimed in claim 1, wherein the multiple stride storage circuitry is arranged to store a table data structure, wherein entries of the table data structure comprise each of the multiple stride values stored in association with respective predicted addresses, and
    wherein the multiple stride storage circuitry is arranged to determine a predicted address for storage in an entry of the table data structure as the current address plus the stride value.

3. The apparatus as claimed in claim 2, wherein the prefetching circuitry comprises sample address storage to store the previously received address for reference by the stride determination circuitry when determining the plurality of stride values for the sequence of received addresses.

4. The apparatus as claimed in claim 2, wherein the prefetching circuitry is responsive to receipt of the current address to cause the multiple stride storage circuitry to perform a lookup for the current address in the propagation table data structure,
    and the multiple stride storage circuitry is responsive to a match between the current address and a hit predicted address in a hit entry in the table data structure to send a correct prediction signal to the prefetch initiation circuitry,
    wherein the prefetch initiation circuitry is responsive to the correct prediction signal to cause the further data value to be retrieved from the further address, wherein the further address is the current address modified by the stride value in the hit entry.

5. The apparatus as claimed in claim 4, wherein the further address is the current address with addition of an address offset, wherein the address offset is the stride value in the hit entry multiplied by a prefetch distance factor.

6. The apparatus as claimed in claim 4, wherein the multiple stride storage circuitry is further responsive to the match between the current address and the hit predicted address in the hit entry in the table data structure to modify the hit predicted address in the hit entry by addition of the stride value.

7. The apparatus as claimed in claim 4, wherein entries of the table data structure further comprise a counter value for each entry,
    wherein the multiple stride storage circuitry is responsive to a non-match between the current address and any of the predicted addresses in the entries of the table data structure to select a victim entry in the table data structure in dependence on the counter values of the entries of the table data structure and to allocate a new entry to replace the victim entry comprising the predicted address and the stride value.

8. The apparatus as claimed in claim 7, wherein the multiple stride storage circuitry is responsive to the match between the current address and the hit predicted address in the hit entry in the table data structure to set the counter value for the hit entry to a predetermined maximum value.

9. The apparatus as claimed in claim 7, wherein the multiple stride storage circuitry is responsive to the non-match between the current address and any of the predicted addresses in the entries of the table data structure to select the victim entry in the table data structure as a victim entry for which the counter value has a predetermined minimum value.

10. The apparatus as claimed in claim 7, wherein the multiple stride storage circuitry is arranged to store an entry pointer,
    and is responsive to the non-match between the current address and any of the predicted addresses in the entries of the table data structure to increment the entry pointer to indicate a next entry in the table data structure and to select the victim entry in the table data structure in further dependence on the entry pointer.

11. The apparatus as claimed in claim 10, wherein the multiple stride storage circuitry is responsive to an increment of the entry pointer causing the entry pointer to reach a predetermined entry of the table data structure to decrease the counter values of the entries of the table data structure.

12. The apparatus as claimed in claim 1, wherein the multiple stride storage circuitry further comprises an incoming stride buffer to store the plurality of stride values corresponding to a sequence of received addresses,
    wherein the incoming stride buffer has a FIFO structure.

13. The apparatus as claimed in claim 1, wherein the multiple stride storage circuitry comprises cumulative stride value storage to store the at least one cumulative stride value.

14. The apparatus as claimed in claim 13, wherein the cumulative stride value storage further comprises score value storage to store at least one score value in association with the at least one cumulative stride value,
wherein the prefetch initiation circuitry is responsive to the at least one score value meeting at least a threshold value to cause the further data value to be retrieved from the further address, wherein the further address is the current address modified by the at least one cumulative stride value.

15. The apparatus as claimed in claim 14, wherein the cumulative stride value storage is responsive to there being a match between a cumulative stride value stored in the cumulative stride value storage and at least one sum of at least two of the plurality of stride values stored in the multiple stride storage circuitry, to increase a score value stored in association with the cumulative stride value.

16. The apparatus as claimed in claim 14, wherein the cumulative stride value storage is responsive to there being no match between a cumulative stride value stored in the cumulative stride value storage and any sum of at least two of the plurality of stride values stored in the multiple stride storage circuitry, to decrease a score value stored in association with the cumulative stride value.

17. The apparatus as claimed in claim 16, wherein the cumulative stride value storage is responsive to the score value stored in association with the cumulative stride value reaching a predetermined minimum value to cause the cumulative stride value to be replaced by a replacement cumulative stride value calculated as a sum of at least two of the plurality of stride values currently stored in the multiple stride storage circuitry.

18. A method of prefetching data values comprising:
retrieving data values from addresses specified by load instructions for storage in a storage component;
receiving the addresses specified by the load instructions;
causing retrieval of a further data value from a further address before the further address is received, wherein causing the retrieval comprises:
determining a stride value as a difference between a current address and a previously received address;
determining a stride sequence comprising a plurality of stride values corresponding to a sequence of received addresses;
storing the plurality of stride values determined;
determining at least one cumulative stride value as a sum of at least two of the plurality of stride values stored;
performing a comparison to determine whether the current address corresponds to a matching stride value based on the plurality of stride values stored;
in response to receiving the current address, determining whether the at least one cumulative stride value is the matching stride value; and
initiating a prefetch procedure to cause the further data value to be retrieved from the further address, wherein the further address is the current address modified by the matching stride value of the plurality of stride values.

19. Apparatus comprising:
means for retrieving data values from addresses specified by load instructions for storage in a storage component;
means for receiving the addresses specified by the load instructions;
means for causing retrieval of a further data value from a further address before the further address is received, wherein the means for causing the retrieval comprises:
means for determining a stride value as a difference between a current address and a previously received address;
means for determining a stride sequence comprising a plurality of stride values corresponding to a sequence of received addresses;
means for storing the plurality of stride values determined;
means for determining at least one cumulative stride value as a sum of at least two of the plurality of stride values stored;
means for performing a comparison to determine whether the current address corresponds to a matching stride value based on the plurality of stride values stored, wherein the means for performing a comparison is responsive to reception of the current address to determine whether the at least one cumulative stride value is the matching stride value; and
means for initiating a prefetch procedure to cause the further data value to be retrieved from the further address, wherein the further address is the current address modified by the matching stride value of the plurality of stride values.

\* \* \* \* \*